Dec. 29, 1959  W. P. OEHLER ET AL  2,919,078
REEL MOUNTING FOR PLANTERS
Filed Dec. 31, 1956
FIG. 1
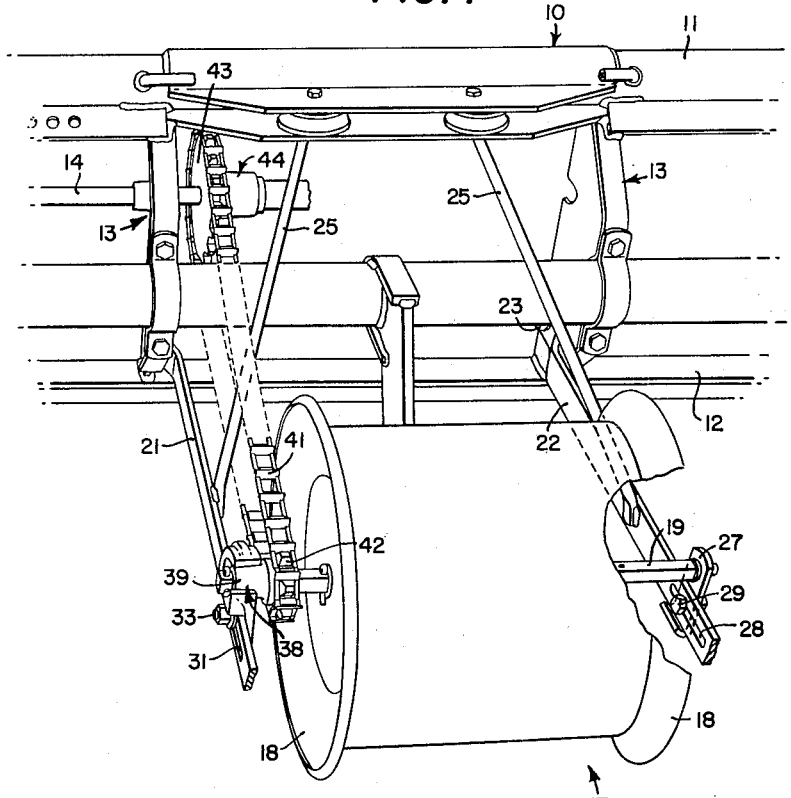
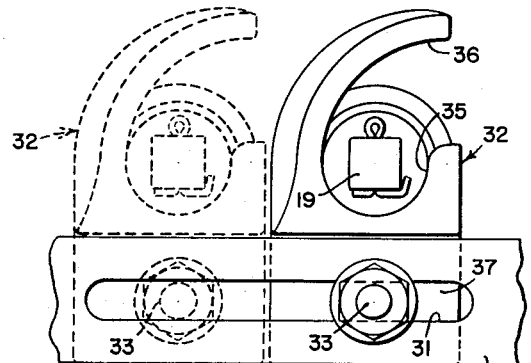
FIG. 2
INVENTORS.
WILLIAM P. OEHLER
HAROLD V. HANSEN
ATTORNEYS United States Patent Office 2,919,078
Patented Dec. 29, 1959

2,919,078

REEL MOUNTING FOR PLANTERS

William P. Oehler, Moline, and Harold V. Hansen, Hillsdale, Ill., assignors, by mesne assignments, to Deere & Company, a corporation of Delaware Application December 31, 1956, Serial No. 631,836

1 Claim. (Cl. 242—86.6)

The present invention relates generally to agricultural implements and more particularly to planting implements, such as those commonly referred to as check row planters in which means is provided for rotatably supporting a check wire reel, from which the check wire is rolled when the check wire is not being used.

The object and general nature of the present invention is the provision of new and improved means for supporting the check wire reel on a planter, which means is so constructed and arranged that the attachment of the reel of wire to the planter, or the disconnection therefrom, as preparatory to laying out the wire, may easily and conveniently be accomplished. More specifically, it is a feature of this invention to provide a check wire reel supporting means which permits the operator to support the check wire reel in an approximate position on the planter, and a further object of this invention is the provision of means on the planter to support both ends of the reel shaft on the reel supporting means, which permits the operator to move around to a more convenient position for manipulating one end of the wire reel into and out of connection with associated driving means.

These and other objects and advantages of the present invention will be apparent to those skilled in the art after a consideration of the following detailed description, taken in conjunction with the accompanying drawings, in which:

Fig. 1 is a fragmentary perspective view of a portion of the planter with reel supporting means.

Fig. 2 is an enlarged view showing means for movably supporting one end of the check wire reel shaft.

The planter in which the principles of the present invention have been embodied is indicated in its entirety by the reference numeral 10 and includes a generally transverse frame that is made up of an upper sill bar 11, preferably in the form of a pipe, and a lower sill bar 12, preferably in the form of an angle. These members, among others, are suitably interconnected by vertical members 13 which also receive and/or support a jackshaft 14 driven by any suitable means, such as the ground wheels (not shown) of the planter. The check wire reel is indicated in its entirety by the reference numeral 17 and includes a pair of heads 18 suitably interconnected and mounted on the generally square reel shaft 19. The planter frame includes a pair of supporting bars 21 and 22 disposed in spaced apart generally fore-and-aft extending relation and fixed, as by bolt means 23, to the lower portions of the vertical frame members 13. Braces 25 are connected at their upper ends to the central portion of the main frame and at the lower rear ends to the rear portions of the bars 21 and 22.

Mounted on the right hand bar 22 is a bracket 27 that is adapted to receive the right end of the reel shaft 19 with a certain amount of looseness. This portion of the bar 22 is slotted, as indicated at 28, and a bolt 29 secures the bracket 27 to the bar. The left hand bar 21 is also slotted at its rear portion, as indicated at 31, and a particular kind of reel shaft support 32 is adjustably fixed to the bar 21, as by a bolt 33. The reel shaft support 32 has a reel shaft receiving opening 35 that is open at its upper rear portion, as by a throat 36. The member 32 preferably is in the form of a casting and has a lower portion 37 that is apertured to receive the bolt 33. The left end of the reel shaft 19 carries a sprocket 38 that includes a hub section 39 that is rotatable in the bracket opening 35. A drive chain 41 is provided and, when the reel is to be driven, as to take up a wire, the sprocket section 42 receives a rear portion of the chain 41 while the forward portion thereof is trained over a drive sprocket 43 that is mounted on the jackshaft 14 and optionally connectible therewith, as by clutch means 44.

By loosening the bolt 33, the bracket 32 may be adjusted forwardly at an amount sufficient to loosen the chain 41 and permit its disconnection from the sprocket 42, and also from the sprocket 43 if desired. The left end of the reel may then be lifted out from the bracket 32 through the throat 36 and laid on the bar 21. The operator may next go around to the other end of the reel and, grasping the right hand head 18, shift the reel bodily so as to move the shaft 19 out of the support member 27. If necessary, that end of the shaft 19 may be placed on the bar 22. The operator may then change his position and go directly to the rear of the reel so that he may readily grasp both heads of the reel and lift the latter with comparative ease from the supporting bars 21 and 22 and deposit the reel on the ground. This action is possible because the construction is such that after the reel shaft 19 is disconnected from the associated brackets 27 and 32, the reel shaft may momentarily be supported on both of the bars 21 and 22. The same is true when mounting the reel, as for transport with the planter to the area of operation. Generally, only eighty rods of wire are carried on a reel, but in certain instances it may be desirable to have one hundred and sixty rods of wire on the reel. The reel is relatively heavy with even only eighty rods of wire thereon, so far as manual handling is concerned, and is quite heavy when containing one hundred sixty rods. Therefore, according to the present invention, we provide means whereby the operator may while grasping both heads of the reel lift the same onto the bars 21 and 22 and rest the same thereon momentarily without having at this time to thread either end of the shaft into its supporting bracket. Then while so supported, the operator may go to one side and, lifting only one-half the weight of the reel, shift the same so as to engage, for example, the right end of the reel shaft in the opening in the bracket 27. Then, going to the other side and again supporting only one-half of the weight of the reel, he may lift the sprocket end of the reel into position by passing the hub section 39 through the throat 36 and into position in the bracket 32.

When it is desired to connect the drive chain 41, it is not necessary to lift either end of the reel, it being necessary only to loosen the bolt 33 and to shift the bracket 32 forwardly so as to permit the chain being mounted on the sprockets, and then shifting the bracket 32 rearwardly to bring the drive chain to the proper tightness. After this, the bolt 33 may be tightened to retain the bracket 32 in the desired position.

While we have shown and described above the preferred structure in which the principles of the present invention has been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

In a planter, a reel frame including a pair of spaced apart reel support arms, a reel including a reel shaft having ends extending from said reel, said reel shaft being longer than the distance between said reel support arms, whereby the reel and shaft may be supported temporarily on said arms by laying said shaft across said arms, driving means for said shaft including a pinion fixed to one end of said shaft, a driving sprocket rotatably mounted on the frame, and a drive chain trained over said sprocket and pinion, a first bearing bracket fixed to one of said arms and adapted to receive the other end of said reel shaft by insertion axially into said bearing bracket, said first bearing bracket comprising a vertical part extending above the associated arm and said upwardly extending part having a laterally facing aperture to receive one end of said shaft, the other arm being slotted, a second bearing bracket slidably mounted on said other arm and also extending vertically above the upper edge of the associated arm, said second bracket being movable along the associated arm into and out of a position opposite said first bearing bracket, said second bearing bracket having a shaft-receiving opening and a throat portion leading into the upper portion of said opening from a point spaced therefrom longitudinally of the associated arm and at the other side of the second bracket opposite the drive chain so as to provide for moving the pinion end of the reel shaft into said opening from an adjacent point on the associated support arm, and fastening means for said second bracket extending through said slot and movable, when loosened, along said slot to provide for changing the position of said second bracket.

References Cited in the file of this patent

UNITED STATES PATENTS

| | | |
|---|---|---|
| 630,833 | Johnston | Aug. 8, 1899 |
| 1,033,906 | Kennedy | July 30, 1912 |
| 2,616,636 | Aden | Nov. 4, 1952 |